United States Patent
Han

(10) Patent No.: US 6,380,514 B1
(45) Date of Patent: Apr. 30, 2002

(54) AUTOMATIC WELDING SYSTEM FOR CYLINDER BLOCK RECYCLING

(75) Inventor: Keum Tai Han, Taejon (KR)

(73) Assignee: Samyoung Machinery Co., Ltd., Taejon (KR)

( * ) Notice: Subject to any disclaimer, the term of this patent is extended or adjusted under 35 U.S.C. 154(b) by 0 days.

(21) Appl. No.: 09/568,767

(22) Filed: May 10, 2000

(30) Foreign Application Priority Data

May 12, 1999 (KR) .......................................... 99-16982

(51) Int. Cl.[7] ................................................ B23K 9/12
(52) U.S. Cl. ...................................... 219/125.1; 901/42
(58) Field of Search ........................ 219/125.11, 125.1, 219/124.34, 60 A, 60 R, 61; 901/42

(56) References Cited

U.S. PATENT DOCUMENTS

| | | | |
|---|---|---|---|
| 4,014,495 A | * 3/1977 | Oda et al. ................. | 219/125.1 |
| 4,233,491 A | * 11/1980 | Maruyama et al. ...... | 219/125.1 |
| 4,288,681 A | * 9/1981 | Niemann ................ | 219/125.11 |
| 4,834,280 A | * 5/1989 | Thielmann ............... | 219/137.2 |
| 5,332,143 A | 7/1994 | Furukawa et al. | |
| 5,510,595 A | 4/1996 | Gainand | |
| 5,515,589 A | 5/1996 | Kazirskis et al. | |
| 5,741,111 A | * 4/1998 | Goostrey .................... | 414/676 |
| 5,966,308 A | 10/1999 | Kazirskis et al. | |

* cited by examiner

*Primary Examiner*—Clifford C. Shaw

(57) ABSTRACT

Disclosed is an automatic welding system for cylinder block recycling. The system welds a cylinder head seating part, an upper cylinder liner assembly part, a lower cylinder liner assembly part and a main bearing assembly part, to enable a cylinder block of an engine to be recycled. The system comprises a supporting section for rotatably supporting the cylinder block; a driving section installed on the supporting section for rotating the cylinder block; a welding section for welding the cylinder head seating part, the upper cylinder liner assembly part, the lower cylinder liner assembly part and the main bearing assembly part of the cylinder block; a moving section for moving the welding section along a lengthwise direction of the cylinder block to a welding execution position; and a central controlling section for controlling the driving section, welding section and the moving section.

20 Claims, 13 Drawing Sheets

AUTOMATIC WELDING SYSTEM FOR CYLINDER BLOCK RECYCLING

BACKGROUND OF THE INVENTION

1. Field of the Invention

The present invention relates to an automatic welding system for cylinder block recycling, and more particularly, the present invention relates to an automatic welding system for cylinder block recycling, which can stably weld a corresponding portion of a cylinder block in a manner such that a cylinder head seating part, an upper cylinder liner assembly part, a lower cylinder liner assembly part and a main bearing assembly part can be precisely defined to enable a cylinder block of a medium-sized or large-sized engine to be recycled.

2. Description of the Related Art

Generally, to a railway car, a generator, a ship or the like, there is mounted a medium-sized or large-sized engine to produce power of a required level. In this medium-sized or large-sized engine, cylinder liners are embedded into a cylinder block and a piston is reciprocatingly disposed in each cylinder liner.

In the meanwhile, in the case that the cylinder block of the engine is used for a lengthy period of time, a cylinder head seating part, an upper cylinder liner assembly part, a lower cylinder liner assembly part, a main bearing assembly part, and so forth may be worn out. Due to this fact, in order to recycle the cylinder block, it is necessary to weld and then machine the above-described parts.

However, for the most part, welding operations for the corresponding parts, thereby to enable the conventional cylinder block of the medium-sized or large-sized engine to be recycled, are manually executed. Consequently, a problem is induced in that precision and quality of welded parts vary depending upon the skillfulness of a worker who executes the welding operations. Specifically, while the upper cylinder liner assembly part and the lower cylinder liner assembly part must be welded to have substantially a uniform thickness along a plurality of concentric circles, even in the case of a highly skilled welder, it is virtually impossible to execute the welding operations in such a manner as to accomplish the same quality throughout a multitude of welding operations.

Further, since these welding operations of the cylinder block of the medium-sized or large-sized engine are mostly executed inside the cylinder block and the cylinder block has an extremely large weight due to its size, the cylinder block cannot be adequately rotated, whereby it is also virtually impossible to execute the welding operations in a precise and rapid manner.

In addition, in the case of manually executing the welding operations, due to the fact that working circumstances are inferior and thereby cause a lack of safety, even a skillful welder does not want to conduct the welding operations. Therefore, because it is difficult to timely employ an appropriate number of welders, a great deal of cost and time is required.

SUMMARY OF THE INVENTION

Accordingly, the present invention has been made in an effort to solve the problems occurring in the related art, and a primary object of the present invention is to provide an automatic cylinder block welding system which can rapidly, precisely and stably weld a predetermined portion of a cylinder block of a medium-sized or large-sized engine thereby enabling the cylinder block to be recycled.

Another object of the present invention is to provide an automatic cylinder block welding system which can automatically execute welding operations for a cylinder head seating part, an upper cylinder liner assembly part, a lower cylinder liner assembly part and a main bearing assembly part of a cylinder block.

Still another object of the present invention is to provide an automatic cylinder block welding system which can move a welding robot to a variety of welding positions and automatically set a welding portion of a cylinder block by automatically rotating the cylinder block.

Yet still another object of the present invention is to provide an automatic cylinder block welding system which can simply clear a welding nozzle, prevent spatterings from adhering to the welding nozzle, cut welding wire to have a proper length, and accurately correct a welding position.

In order to achieve the above objects, according to the present invention, there is provided an automatic welding system for cylinder block recycling, the system welding a cylinder head seating part, an upper cylinder liner assembly part, a lower cylinder liner assembly part and a main bearing assembly part, to enable a cylinder block of an engine to be recycled, the system comprising: a supporting section for rotatably supporting the cylinder block; a driving section installed on the supporting section for rotating the cylinder block; a welding section for welding the cylinder head seating part, the upper cylinder liner assembly part, the lower cylinder liner assembly part and the main bearing assembly part of the cylinder block; a moving section for moving the welding section along a lengthwise direction of the cylinder block to a welding execution position; and a central controlling section for controlling the driving section, welding section and the moving section.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
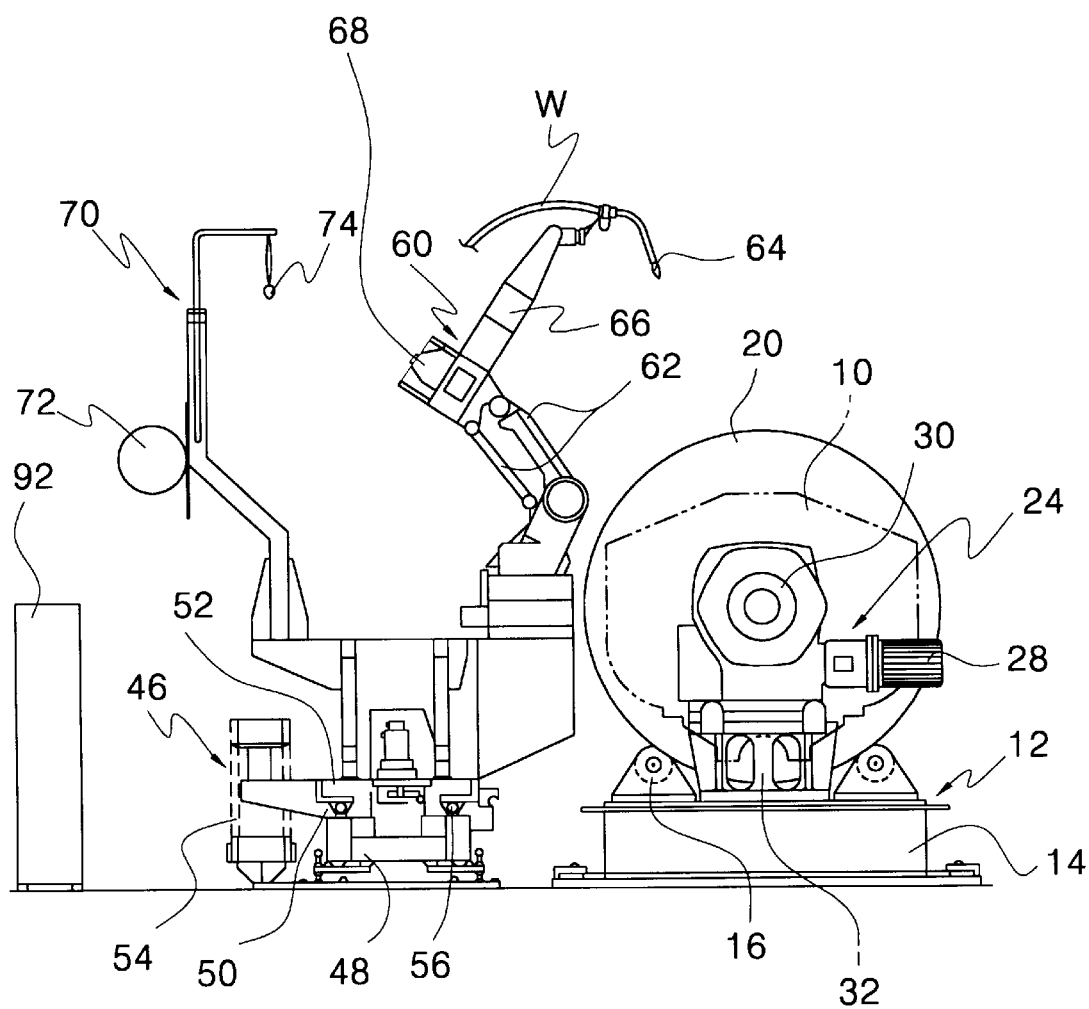
FIG. 1 is a side view illustrating an entire construction of an automatic welding system for cylinder block recycling, in accordance with a first embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
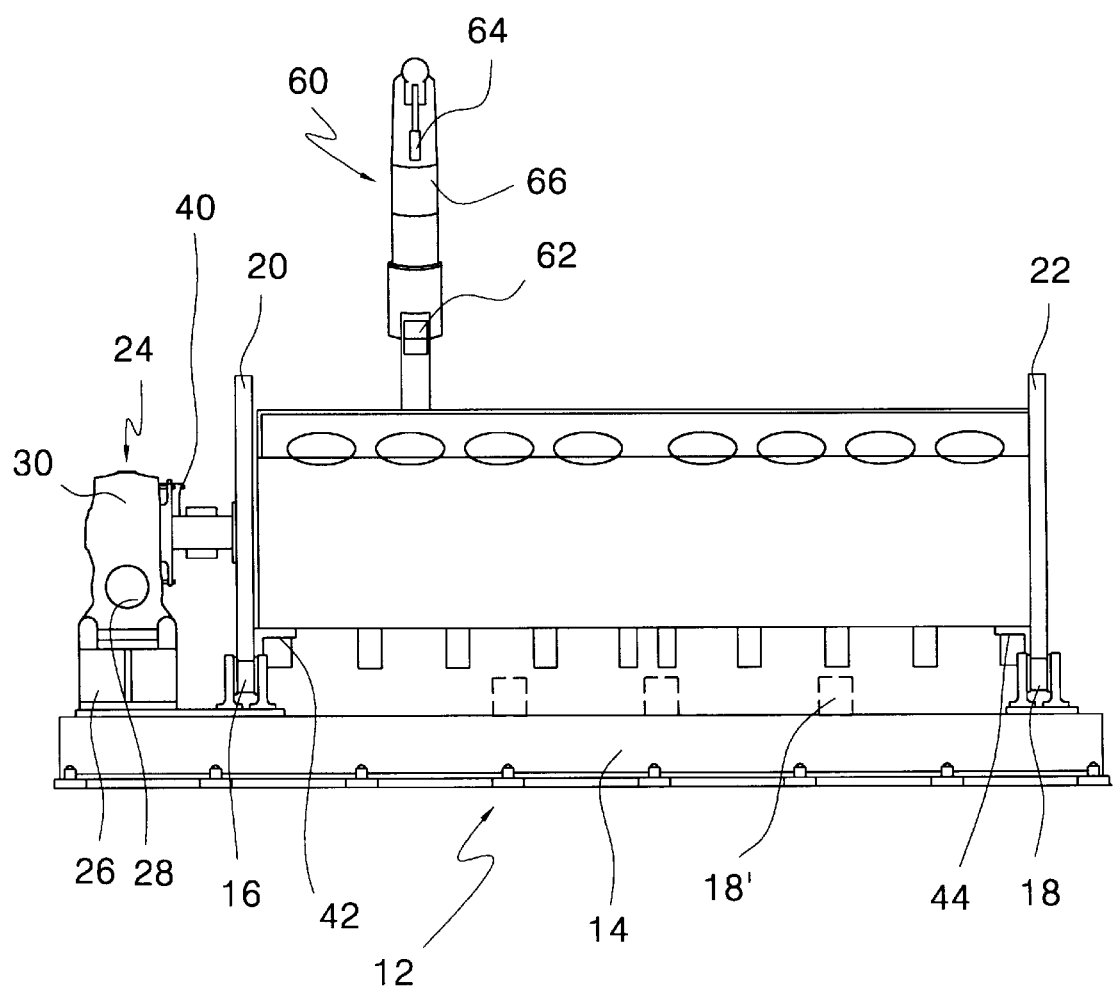
FIG. 2 is a front view of the automatic cylinder block welding system of FIG. 1.

First, referring to FIGS. 1 and 2 which are a side view and a front view, respectively, of an automatic welding system for cylinder block recycling, in accordance with a first embodiment of the present invention, the automatic welding system includes a supporting section 12 for rotatably supporting a cylinder block 10 to be recycled. The supporting section 12 has a first base 14 which is installed on the ground or a preset bottom.

On the first base 14, there are installed four supporting rollers for rotating the cylinder block 10. Describing in more detail, the four supporting rollers define two pairs of supporting rollers at both sides of the first base 14, that is, a first pair of supporting rollers 16 (see FIG. 1) and a second pair of supporting rollers 18 (see FIG. 2). In the present embodiment, it can be assumed that two pairs of supporting rollers are used as illustrated in the drawings by solid lines, for welding a super-large cylinder block 10. However, it is to be readily understood that, for example, in the case of welding a medium-sized or large-sized cylinder block which is smaller than the super-large cylinder block 10, one pair among a plurality of second pairs of supporting rollers 18' as shown in FIG. 2 by dotted lines can be selectively used.

A fixing roller is rotatably engaged with each pair of supporting rollers. For example, a first fixing roller 20 to which one end of the cylinder block 10 is detachably fastened, is rotatably engaged with the first pair of supporting rollers 16, and a second fixing roller 22 to which the other end of the cylinder block 10 is detachably fastened, is rotatably engaged with the second pair of supporting rollers 18.

A driving section 24 which supplies power for actually rotating the cylinder block 10, is installed on one end of the first base 14 of the supporting section 12. The driving section 24 includes a mounting bracket 26 which is fastened to the supporting section 12, a driving motor 28 which is mounted to the mounting bracket 26, and a reduction gear 30 for receiving rotating force of the driving motor 28 and stably rotating the first and second fixing rollers 20 and 22, that is, the cylinder block 10. Due to the fact that the first fixing roller 20 is detachably fastened to the reduction gear 30, if the reduction gear 30 is rotatably driven, as the first and second fixing rollers 20 and 22 are rotated at the same time, the cylinder block 10 is rotated.

On the other hand, as shown in FIGS. 3 through 9, in order to stably and fixedly maintain the cylinder block 10 to one of a diversity of predetermined welding positions, a plurality of fixing holes are perforated into the first fixing roller 20. In other words, it is preferred that a reference hole 32 for allowing the cylinder block 10 to be initially installed and set at a ready-to-be-weld position and first through fifth fixing holes 32a, 32b, 32c, 32d and 32e for setting the cylinder block at one of the diversity of welding positions as described later in detail, are perforated into the first fixing roller 20 (see FIG. 8). Also, a fixing section 34 is installed on the first base 14 in a manner such that it cooperates with the holes (see FIG. 9). The fixing section 34 includes a bracket 36 which is fastened to the first base 14 and a fixing pin 38 which is fastened to the bracket 36 and inserted into one of the plurality of fixing holes 32, 32a, 32b, 32c, 32d and 32e which are formed in the first fixing roller 20 in a manner such that it can be selectively removed therefrom.

Figure 10:
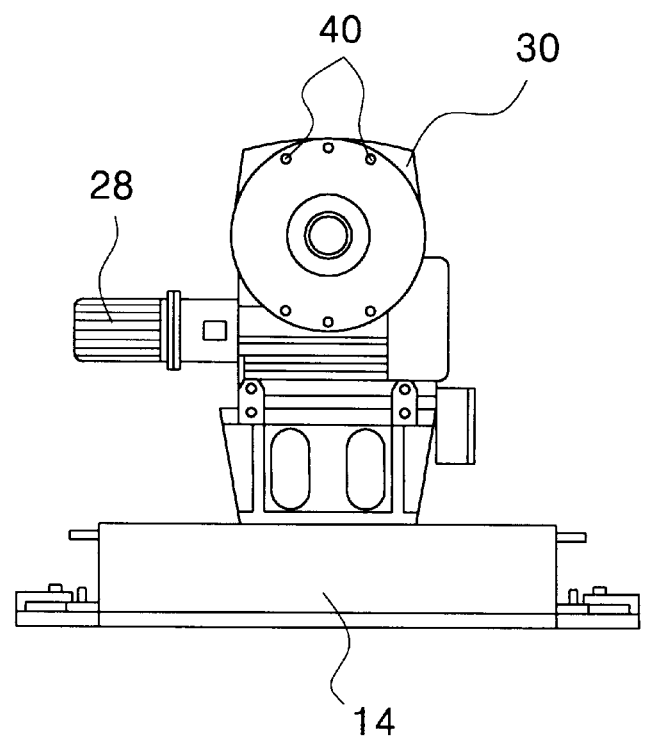
FIG. 10 is a rear view illustrating a reduction gear in a state wherein fixing rollers are not mounted to the automatic welding system of FIG. 1.

As best shown in FIG. 10, a plurality of position sensors 40 for detecting a rotating angle of the cylinder block 10, that is, the fist fixing roller 20, are installed on one end of the reduction gear 30. It is preferred that each of the position sensors 40 comprises a proximity sensor. Of course, it will be appreciated that reference lines (not shown) for activating the sensors are indexed or provided on an outer surface of the first fixing roller 20.

Also, it is preferable to define the installation locations of the plurality of position sensors 40 in a manner such that welding parts of the cylinder block 10 as will be described later can be most suitably welded by a welding robot at the installation positions, respectively.

Figure 9:
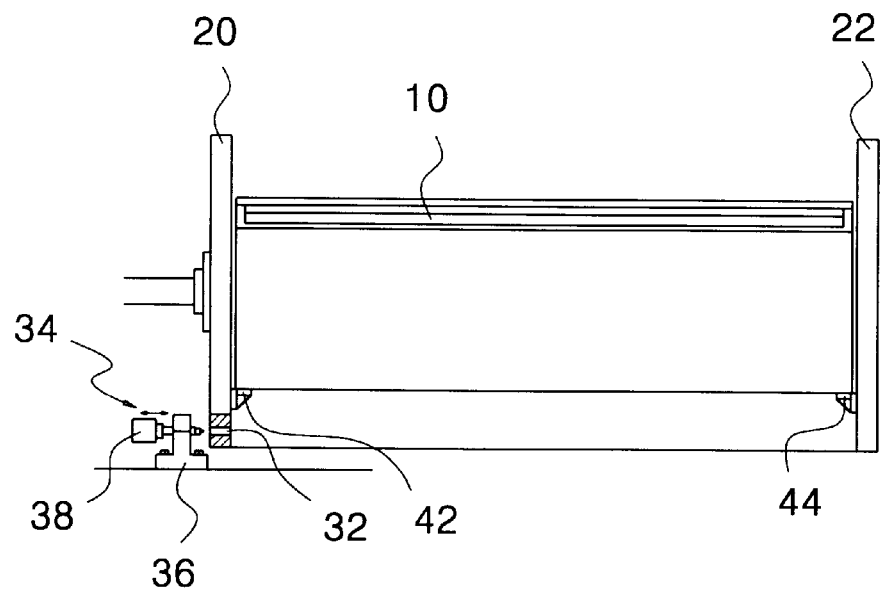
FIG. 9 is a front view illustrating an installation state of a fixing pin in the automatic welding system of FIG. 1.

In the meanwhile, in order to stably fasten the cylinder block 10 to the first and second fixing rollers 20 and 22, an inner surface of the first fixing roller 20 is provided with a first fastening piece 42 and an inner surface of the second fixing roller 22 is provided with a second fastening piece 44 (see FIG. 9). Of course, persons skilled in the art will readily recognize that the first and second fastening pieces 42 and 44 may be provided with fastening bolts to stably fasten both ends of the cylinder block 10 to the first and second fixing rollers 20 and 22.

A moving section 46 to which a welding section as will be described later is movably mounted, is arranged at a side of the supporting section 12. The moving section 46 includes a pair of guide rails 50 which are fastened to the ground or a preset bottom through a second base 48 which is similar to the first base 14 of the supporting section 12, and a supporting member 52 which is able to be reciprocated along a lengthwise direction of the pair of guide rails 50 and on which the welding section is mounted. It is preferred that the moving section 46 further includes a conveyor 54 which is capable of reciprocating the supporting member 52 along the lengthwise direction of the pair of guide rails 50. Optionally, it is preferred that a plurality of guide rollers 56 for rendering smooth reciprocating movement of the supporting member 52 are installed on a lower surface of the supporting member 52 which faces the pair of guide rails 50.

Figure 11:
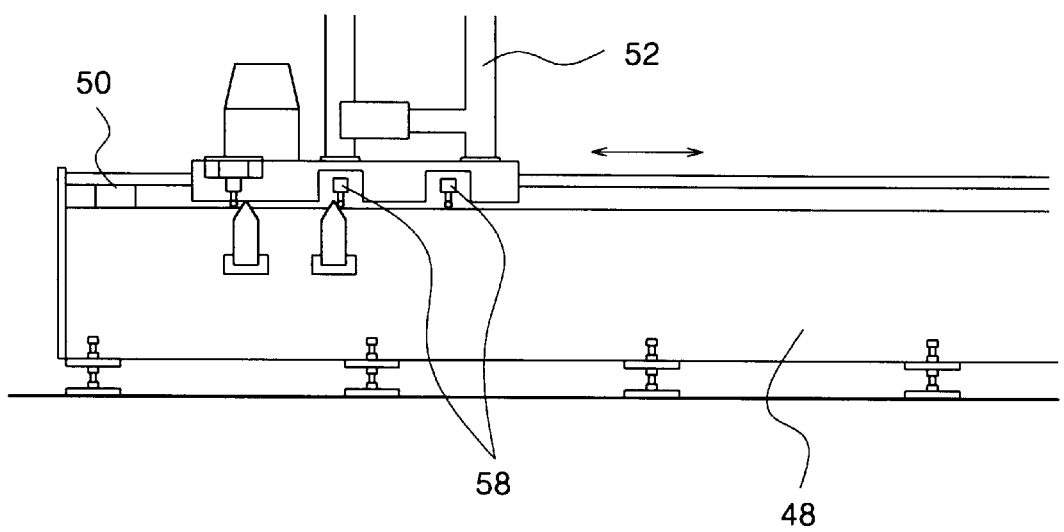
FIG. 11 is a front view illustrating an installation state of limit switches in the automatic welding system of FIG. 1.

As can be readily seen from FIG. 11, it is preferred that a plurality of limit switches 58 for detecting an initial position and a reference position upon reciprocation, of the supporting member 52 on second base 48 or the pair of guide rails 50 are installed on the moving section 46. These limit switches 58 not only perform a function of establishing an initial position and detecting a moved position of the welding section, but also serve as stoppers for preventing the welding section from going out of preset positions upon stepwise interruptions or a final stop of welding operations.

The welding section 60 for actually welding the cylinder block 10 is installed on an upper surface of the supporting member 52. It is preferred that the welding section 60 is constructed to have a configuration of a robot. Basically, the welding section 60 includes a connector 62 which is operatively fastened to the supporting member 52 through a bracket, and a welding gun 66 which is sequentially operatively fastened to the connector 62 and has a welding nozzle 64 for actually fusing welding wire W to the cylinder block 10. Optionally, it is preferred that the welding section 60 further includes a tensioning section 68 for preventing the welding wire W from being excessively sagged or tensed. Of course, a welding wire supplying section 70 for continuously supplying the welding wire W to the welding section 60 is installed in place on the supporting member 52. The welding wire supplying section 70 includes a roll 72 for winding the welding wire W therearound in a manner such that the welding wire W can be paid off therefrom, and a hanger 74 for stably holding the welding wire W between the roll 72 and the welding gun 66.

Figure 12:
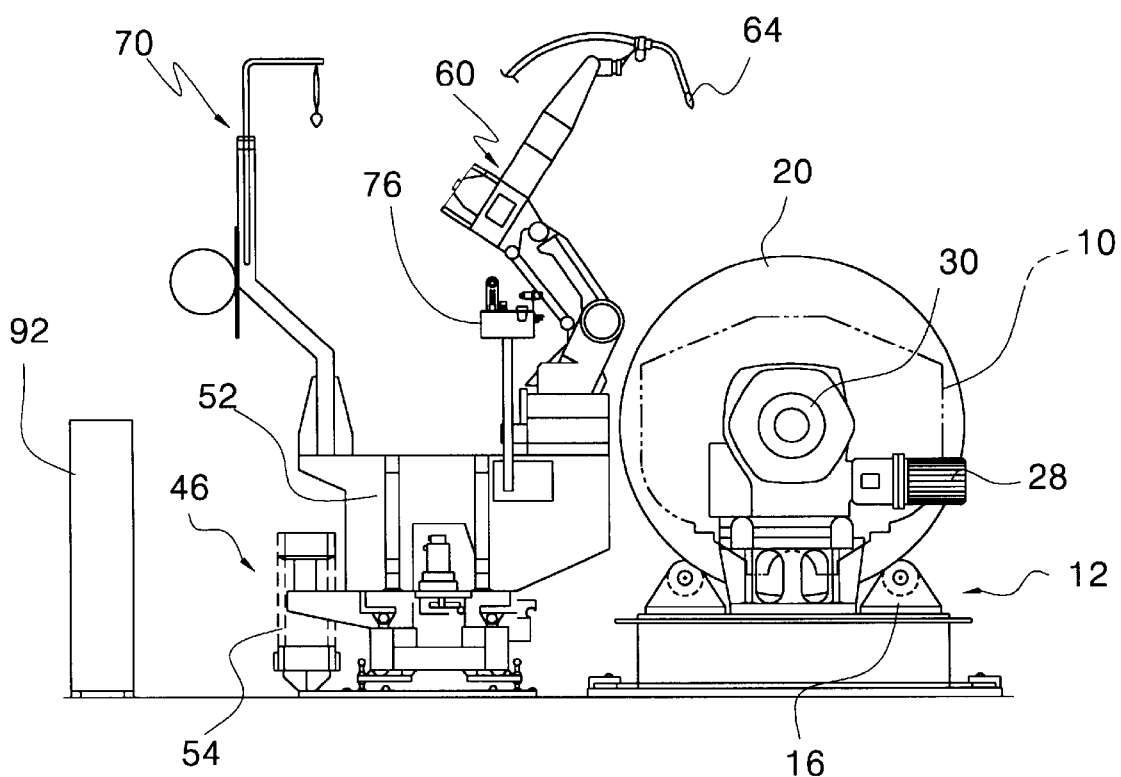
FIG. 12 is a side view illustrating an entire construction of an automatic welding system for cylinder block recycling, in accordance with a second embodiment of the present invention.
Figure 13:
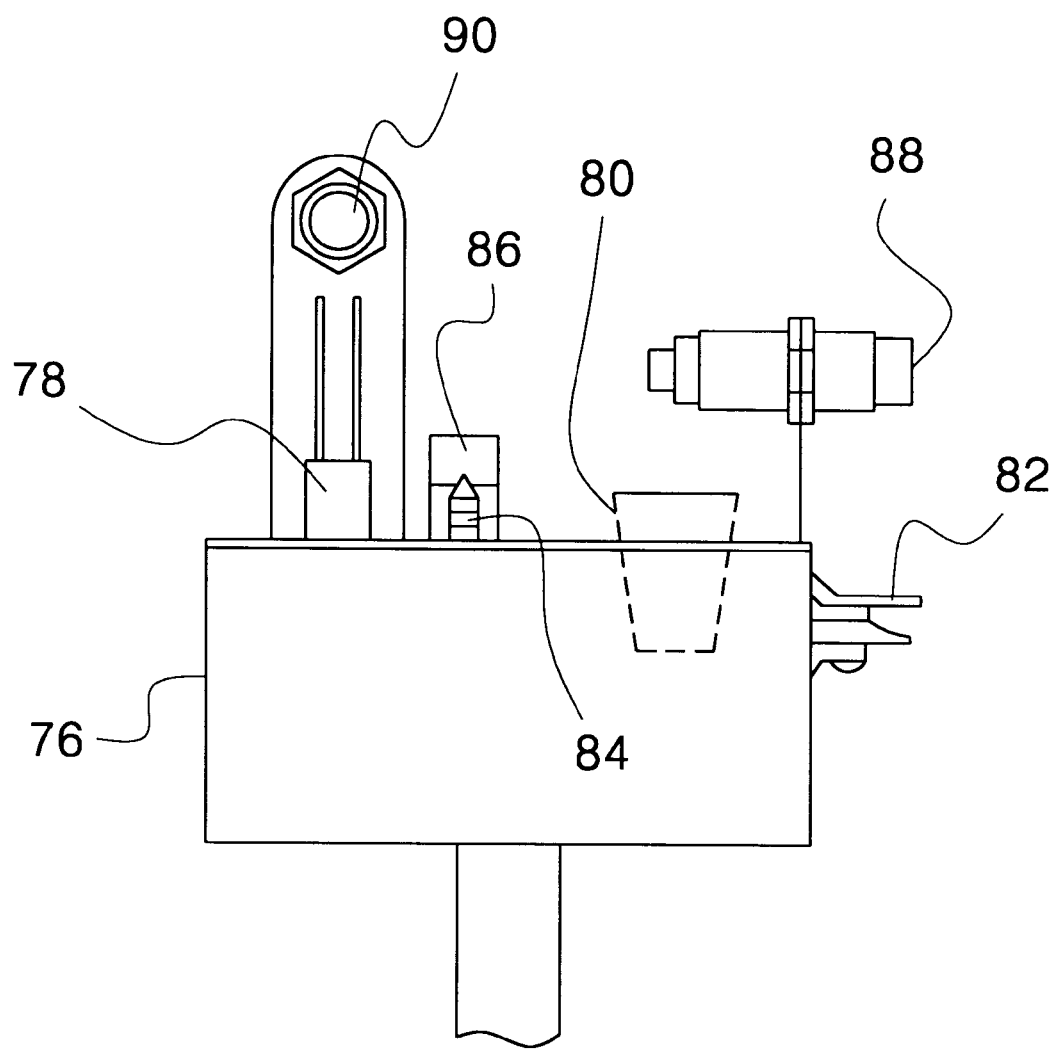
FIG. 13 is an enlarged side view illustrating details of a welding nozzle adjusting section provided to the automatic welding system of FIG. 12.
Figure 14:
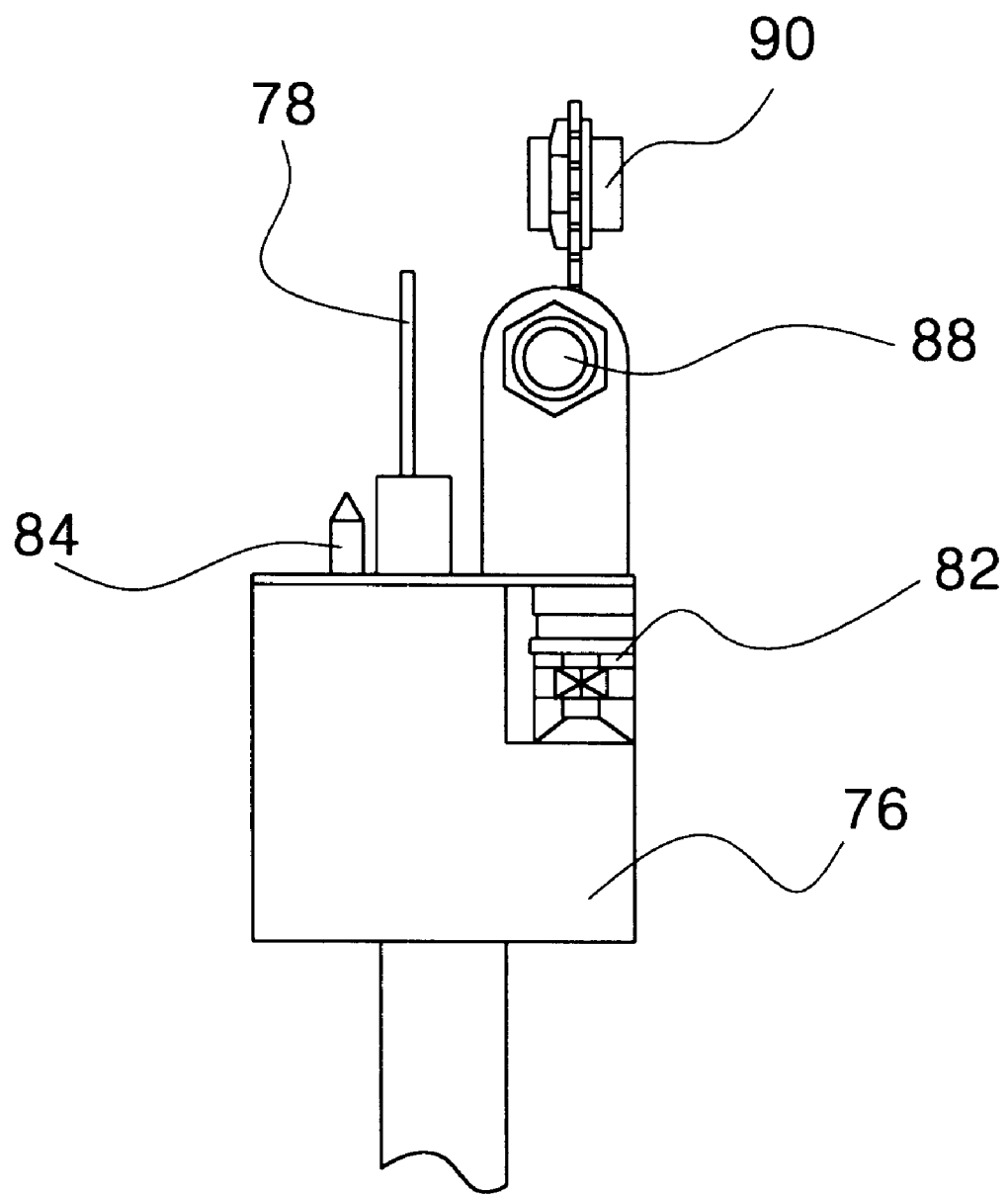
FIG. 14 is a front view of the welding nozzle adjusting section of FIG. 13.

Meanwhile, as shown in FIGS. 12 through 14, an automatic welding system in accordance with a second embodiment of the present invention includes a welding nozzle adjusting section 76 for cleaning and adjusting the welding nozzle 64 of the welding section 60. Describing in more detail, the welding nozzle adjusting section 76 includes a clearing section for clearing the welding nozzle 64 which is formed in the welding gun 66 of the welding section 60, that is, a brush 78 for removing or clearing spatterings which adhere to the welding nozzle 64 of the welding gun 66 while continuously using the welding section 60.

The welding nozzle adjusting section 76 further includes a spatter preventing fluid applier 80 which is stored with spatter preventing fluid for minimizing or preventing the phenomenon in which spatterings adhere to the welding nozzle 64.

Moreover, the welding nozzle adjusting section 76 further includes a welding wire cutter 82 for allowing proper adjustment of a length of the welding wire W in the case that the welding wire W projects out of the welding nozzle 64 of the welding section 60 to a length which is longer than is necessary. By properly maintaining a length of the welding wire W in this way, it is possible to minimize arc generation.

In particular, the welding nozzle adjusting section further includes a welding nozzle position detector 84 for identifying, detecting and correcting a change in each welding position when an operational error is caused in the welding section 60 and other peripheral sections due to use of the welding section 60 over a lengthy period of time. It is preferred that the welding nozzle position detector 84 has a probe for detecting a precise position of the welding nozzle 64 and a guide 86 for guiding the welding nozzle 64 toward the probe is provided adjacent to the probe.

Further, the welding nozzle adjusting section 76 further includes a pair of proximity sensors 88 and 90 for sensing and identifying a position and forward, rearward, leftward and rightward movement of the welding gun 66 or welding nozzle 64 of the welding section 60.

It should be noted that all the above-described components which constitute the automatic cylinder block welding systems in accordance with the first and second embodiments of the present invention, are connected to a central control section 92, whereby the automatic cylinder block welding system can be automatically operated in its entirety.

Hereinafter, operations and working modes of the automatic cylinder block welding system according to the present invention will be described in detail.

First, a worker or welder positions the cylinder block 10 to be recycled, above the first base 14 of the supporting section 12, after being shifted using a lifting device such as a hoist. Then, the one end of the cylinder block 10 is fastened to the first fixing roller 20 and the other end of the cylinder block 10 is fastened to the second fixing roller 22. In fact, the one end of the cylinder block 10 is fastened by a bolt to the first fastening piece 42 which is provided to the inner surface of the first fixing roller 20, and the other end of the cylinder block 10 is stably fastened by a bolt to the second fastening piece 44 which is provided to the inner surface of the second fixing roller 22. On the other hand, before or when the cylinder block 10 is mounted to the first and second fixing rollers 20 and 22, the fixing pin 38 of the fixing section 34 is inserted into the reference hole 32 which is perforated into the first fixing roller 20, thereby to fixedly maintain the cylinder block 10. According to this, the first and second fixing rollers 20 and 22 and the cylinder block 10 are fixed so that the cylinder block 10 can be held at a ready-to-be-welded position, that is, in a steadily fixed state, as shown in FIG. 1.

Figure 3:
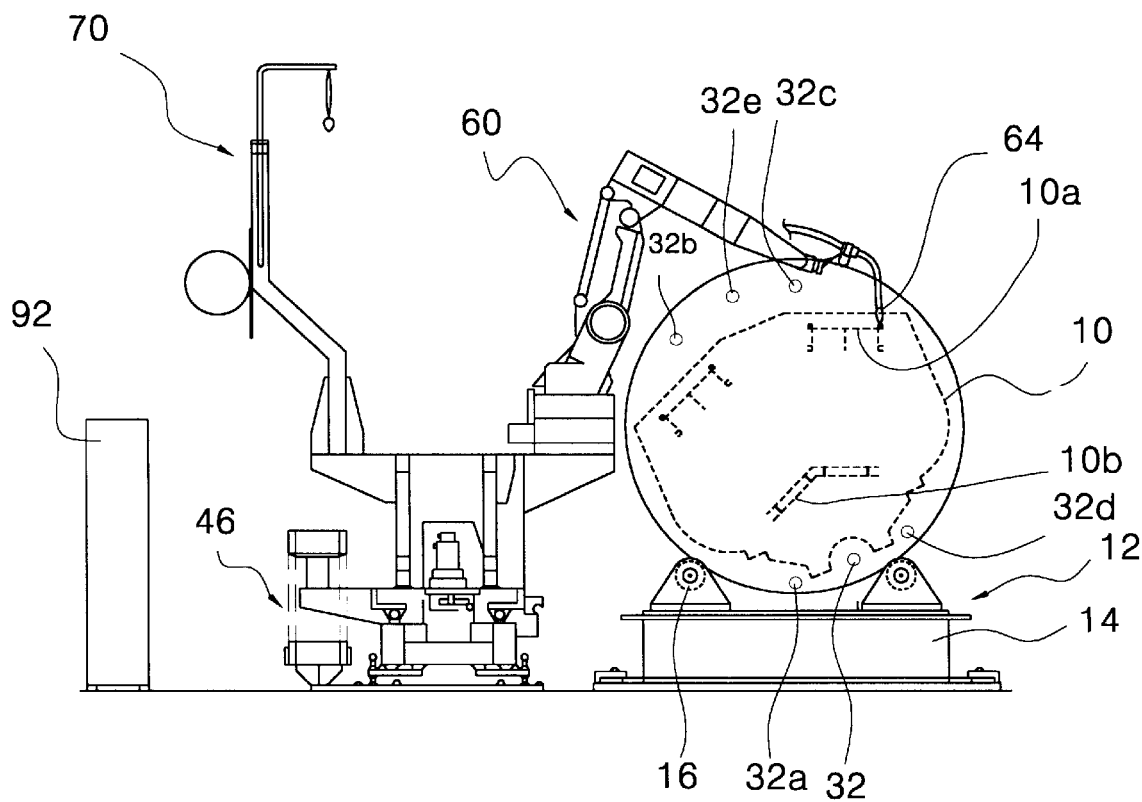
FIG. 3 is a side view illustrating a state wherein one upper cylinder liner assembly part is welded by the automatic welding system of FIG. 1.

In this ready status, if the worker manipulates the central control section 92 after removing the fixing pin 38 from the reference hole 32, the driving motor 28 and the is reduction gear 30 of the driving section 24 are operated and the first and second fixing rollers 20 and 22 are rotated. This rotation of the first and second fixing rollers 20 and 22 is continued, for example, until the first fixing hole 32a of the first fixing roller 20 reaches a position where it faces the fixing section 34, and then, is interrupted. Of course, it is to be readily understood that this precise rotation of the first fixing roller 20 is controlled through the central control section 92 by being sensed by the plurality of position sensors 40. As a consequence, as shown in FIG. 3, the cylinder block 10 is set to a first welding position where one cylinder head seating part and one upper cylinder liner assembly part 10a can be welded. In this state, the worker inserts the fixing pin 38 of the fixing section 34 into the first fixing hole 32a to fixedly maintain the cylinder block 10.

Thereafter, as the worker manipulates the central control section 92, the welding nozzle 64 of the welding section 60 welds the one upper cylinder liner assembly part 10a, as shown in FIG. 3. If the welding operation of the one upper cylinder liner assembly part 10a is completed, the welding section 60 is returned to the initial position and the operation thereof is temporarily interrupted.

Figure 4:
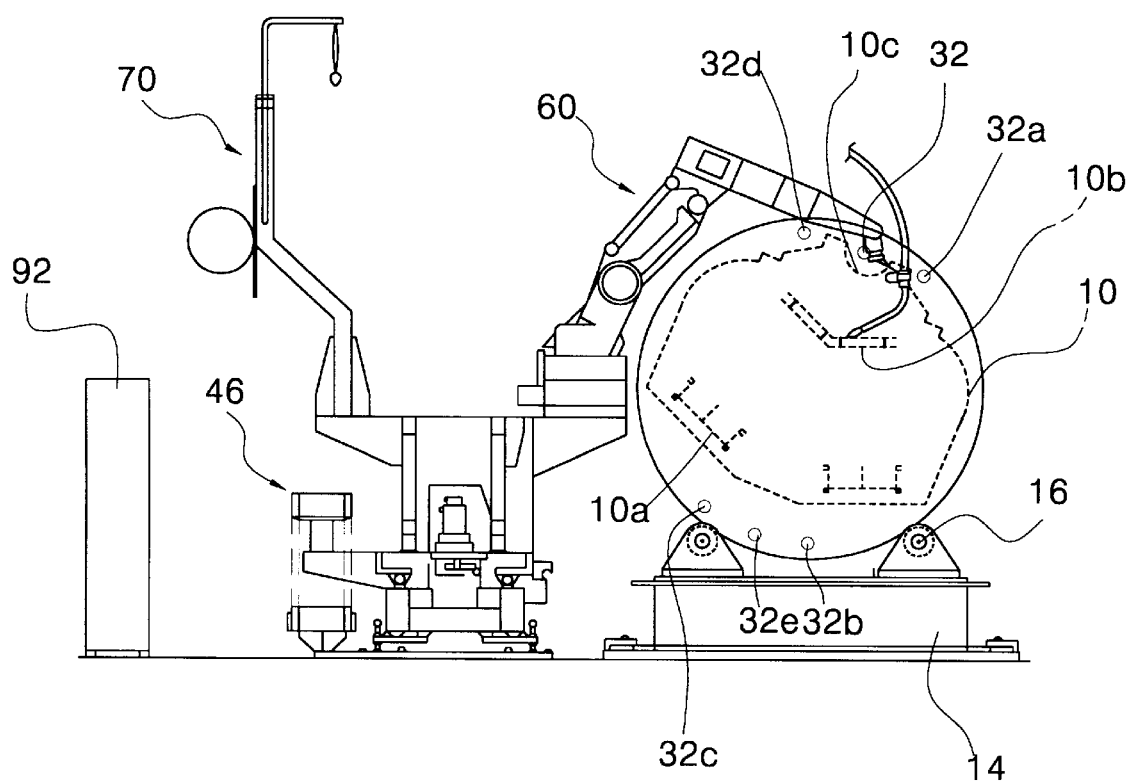
FIG. 4 is a side view illustrating a state wherein one lower cylinder liner assembly part is welded by the automatic welding system of FIG. 1.
Figure 5:
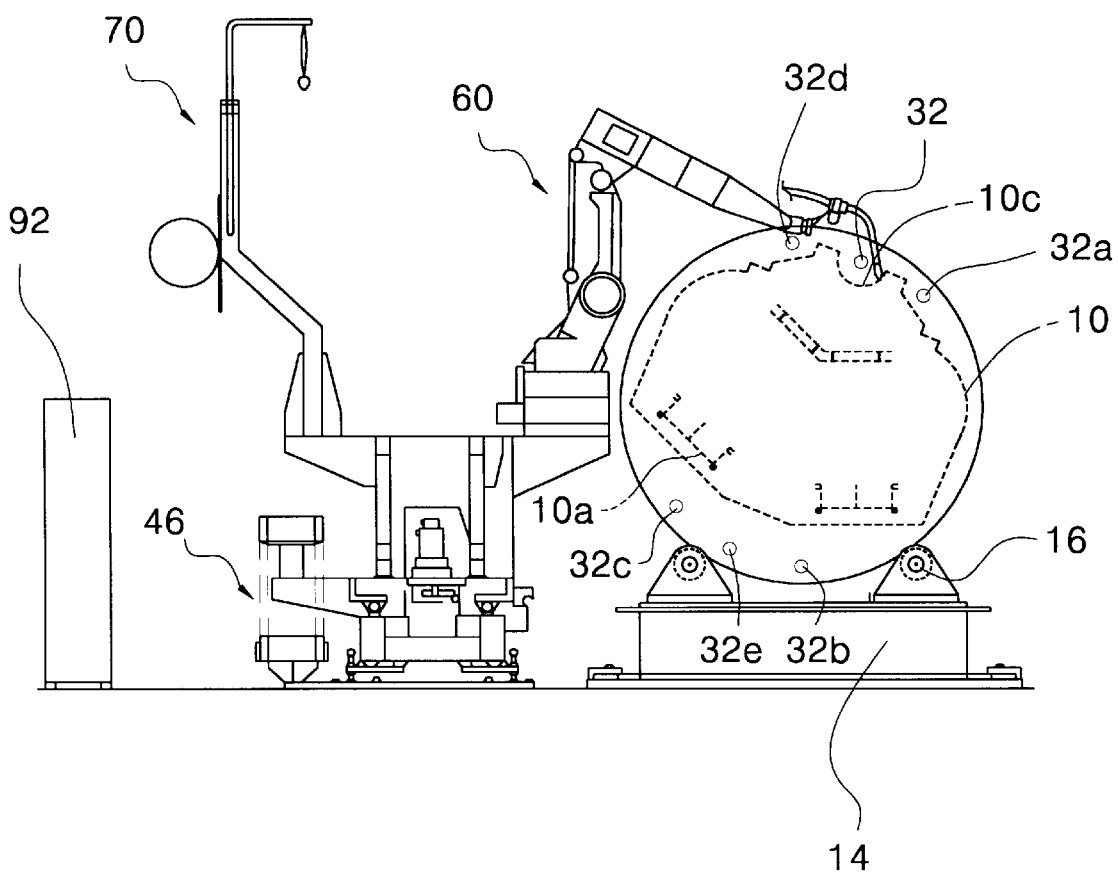
FIG. 5 is a side view illustrating a state wherein one portion of a main bearing assembly part is welded by the automatic welding system of FIG. 1.

In this state, if the worker manipulates the central control section 92 after removing the fixing pin 38 from the first fixing hole 32a, the driving motor 28 and the reduction gear 30 of the driving section 24 are operated and the first and second fixing rollers 20 and 22 are rotated. This rotation of the first and second fixing rollers 20 and 22 is continued, for example, until the second fixing hole 32b of the first fixing roller 20 reaches a position where it faces the fixing section 34, and then, is interrupted. Of course, it is to be readily understood that this precise rotation of the first fixing roller 20 is controlled through the central control section 92 by being sensed by the plurality of position sensors 40. As a consequence, as shown in FIGS. 4 and 5, the cylinder block 10 is set to a second welding position where one lower cylinder liner assembly part 10b and one portion of a main bearing assembly part 10c can be welded. In this state, the worker inserts the fixing pin 38 of the fixing section 34 into the second fixing hole 32b to fixedly maintain the cylinder block 10.

Thereupon, as the worker manipulates the central control section 92, the welding nozzle 64 of the welding section 60 welds the one lower cylinder liner assembly part 10b, as shown in FIG. 4. If the welding operation of the one lower cylinder liner assembly part 10b is completed, the welding nozzle 64 of the welding section 60 welds the one portion of the main bearing assembly part 10c, as shown in FIG. 5. If the welding operations of the one lower cylinder liner assembly part 10b and the one portion of the main bearing assembly part 10c are completed in these ways, the welding section 60 is returned to the initial position and the operation thereof is temporarily interrupted.

Figure 6:
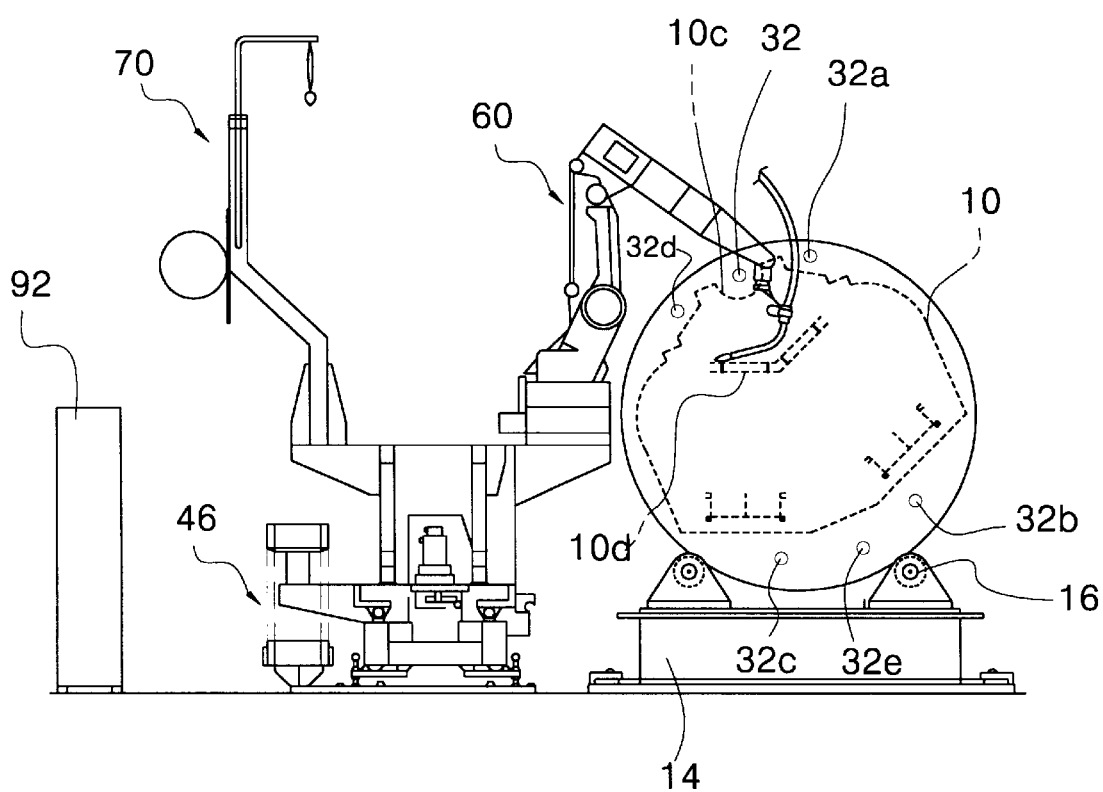
FIG. 6 is a side view illustrating a state wherein the other lower cylinder liner assembly part is welded by the automatic welding system of FIG. 1.
Figure 7:
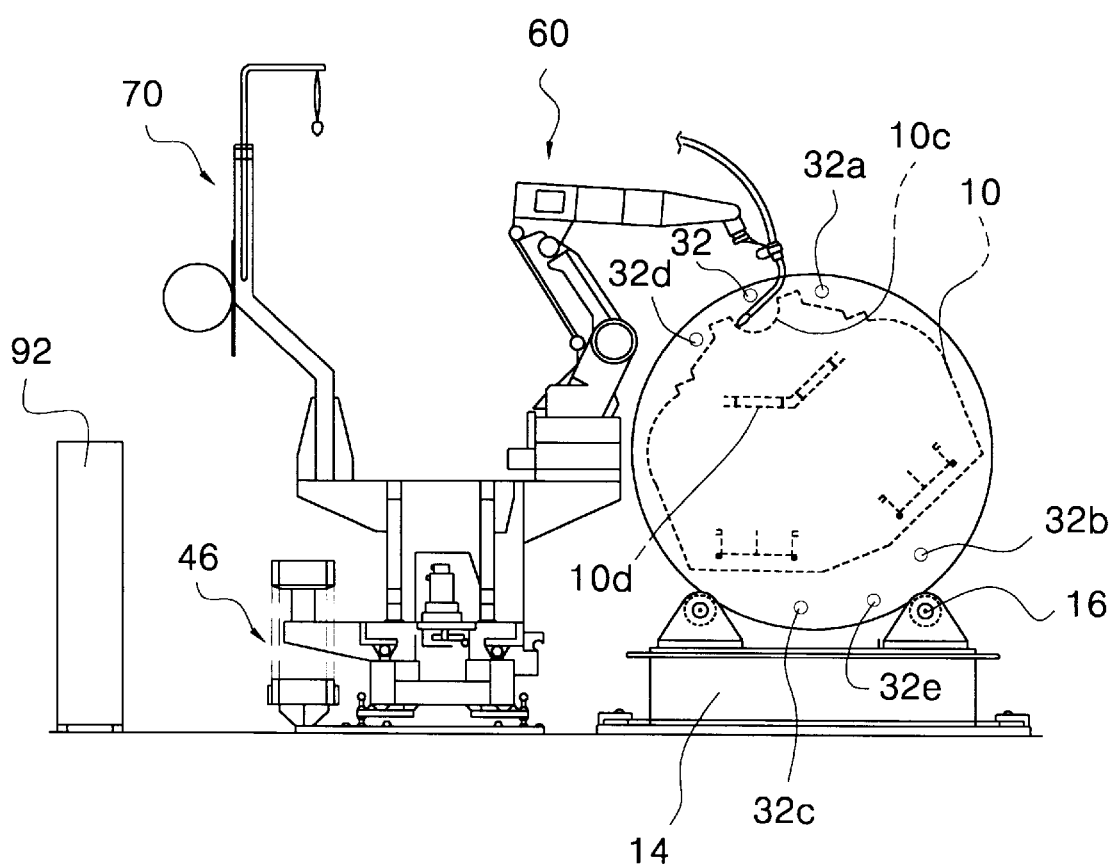
FIG. 7 is a side view illustrating a state wherein the other portion of the main bearing assembly part is welded by the automatic welding system of FIG. 1.

In this state, if the worker manipulates the central control section 92 after removing the fixing pin 38 from the second fixing hole 32b, the driving motor 28 and the reduction gear 30 of the driving section 24 are operated and the first and second fixing rollers 20 and 22 are rotated. This rotation of the first and second fixing rollers 20 and 22 is continued, for example, until the third fixing hole 32c of the first fixing roller 20 reaches a position where it faces the fixing section 34, and then, is interrupted. Of course, it is to be readily understood that this precise rotation of the first fixing roller 20 is controlled through the central control section 92 by being sensed by the plurality of position sensors 40. As a consequence, as shown in FIGS. 6 and 7, the cylinder block 10 is set to a third welding position where the other lower cylinder liner assembly part 10d and the other portion of the main bearing assembly part 10c can be welded. In this state, the worker inserts the fixing pin 38 of the fixing section 34 into the third fixing hole 32c to fixedly maintain the cylinder block 10.

Next, as the worker manipulates the central control section 92, the welding nozzle 64 of the welding section 60 welds the other lower cylinder liner assembly part 10d, as shown in FIG. 6. If the welding operation of the other lower cylinder liner assembly part 10d is completed, the welding nozzle 64 of the welding section 60 welds the other portion of the main bearing assembly part 10c, as shown in FIG. 7. If the welding operations of the other lower cylinder liner assembly part 10d and the other portion of the main bearing assembly part 10c are completed in these ways, the welding section 60 is returned to the initial position and the operation thereof is temporarily interrupted.

Figure 8:
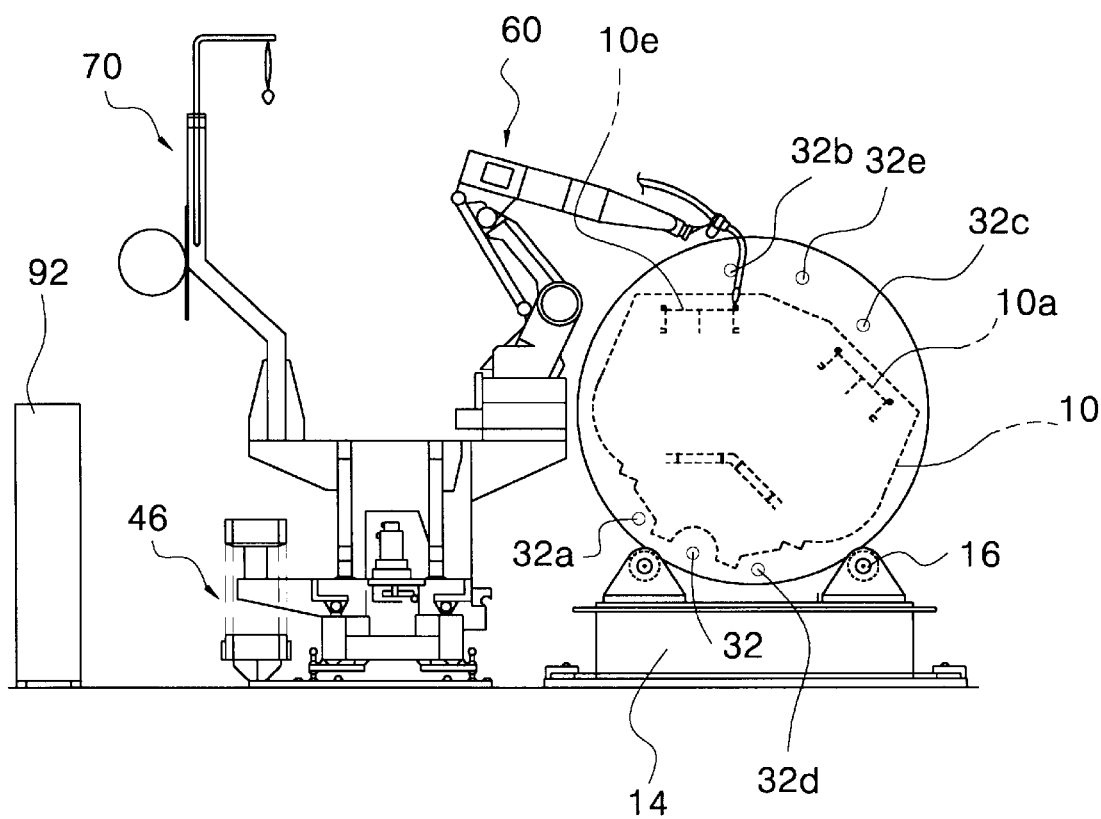
FIG. 8 is a side view illustrating a state wherein the other upper cylinder liner assembly part is welded by the automatic welding system of FIG. 1.

In this state, if the worker manipulates the central control section 92 after removing the fixing pin 38 from the third fixing hole 32c, the driving motor 28 and the reduction gear 30 of the driving section 24 are operated and the first and second fixing rollers 20 and 22 are rotated. This rotation of the first and second fixing rollers 20 and 22 is continued, for example, until the fourth fixing hole 32d of the first fixing roller 20 reaches a position where it faces the fixing section 34, and then, is interrupted. Of course, it is to be readily understood that this precise rotation of the first fixing roller 20 is controlled through the central control section 92 by being sensed by the plurality of position sensors 40. As a consequence, as shown in FIG. 8, the cylinder block 10 is set to a fourth welding position where the other cylinder head seating part and the other upper cylinder liner assembly part 10e can be welded. In this state, the worker inserts the fixing pin 38 of the fixing section 34 into the fourth fixing hole 32d to fixedly maintain the cylinder block 10.

Then, as the worker manipulates the central control section 92, the welding nozzle 64 of the welding section 60 welds the other cylinder head seating part and the other upper cylinder liner assembly part 10e, as shown in FIG. 8. If the welding operation of the other upper cylinder liner assembly part 10e is completed, the welding nozzle 64 of the welding section 60, the welding section 60 is returned to the initial position and the operation thereof is temporarily interrupted.

As stated above, if the welding operations of the cylinder head seating parts, the upper cylinder liner assembly parts, the lower cylinder liner assembly parts and the main bearing assembly parts are completed, the worker returns the cylinder block 10 to the ready-to-be-welded position. That is to say, by removing the fixing pin 38 from the fourth fixing hole 32d, rotating the cylinder block 10 to the ready-to-be-welded position and inserting the fixing pin 38 into the reference hole 32, the cylinder block 10 is set at the ready-to-be-welded position.

In this state, the welding section 60 is moved to a place for welding next cylinder liner and main bearing assembly parts for a second cylinder, by the worker or the central control section 92. Namely, as the supporting member 52 of the moving section 46 is moved along the pair of guide rails 50, the welding section 60 is moved to a predetermined position, that is, a position for welding the next cylinder liner and main bearing assembly parts for the second cylinder. This movement of the supporting member 52 is conducted through the conveyor 54. Here, the movement of the welding section 60 is detected by the plurality of limit switches 58 to be precisely controlled by the central control section 92.

In this state, as the worker removes again the fixing pin 38 from the reference hole 32, welding operations of the next cylinder liner and main bearing assembly parts for the second cylinder which is defined in the cylinder block 10, can be undertaken, in the same manner as described above.

Of course, by continuously and repeatedly performing the above-described processes, it is possible to weld cylinder head seating parts, upper cylinder liner assembly parts, lower cylinder liner assembly parts and main bearing assembly parts which are formed in the entire cylinder block 10.

In the meanwhile, in the case that foreign material or spatterings adhere to the welding nozzle 64 of the welding section 60 in the course of continuously executing the welding operations, the worker or the central control section 92 can remove the spatterings from the welding nozzle 64 or clear the welding nozzle 64. Of course, it is possible to enable the welding nozzle 64 to be automatically cleared before or after executing the welding operations, by using the brush 78 which is formed in the welding nozzle adjusting section 76. It is also possible to apply spatter preventing fluid, by using the spatter preventing fluid applier 80 before or after executing the welding operations, thereby to minimize or prevent the phenomenon in which spatterings adhere to the welding nozzle 64.

Additionally, in the case that the welding wire W projects out of the welding nozzle 64 of the welding section 60 to a length which is longer than is necessary, it is possible to cut the welding wire W using the welding wire cutter 82, whereby the welding wire W is allowed to project out of the welding nozzle 64 to a proper length. By this, it is possible to stabilize arc generation and thereby enhance working efficiency.

Specifically, when the welding operations are continuously and repeatedly executed or the welding section 60 is used for a lengthy period of time, in the case that it seems for an origin or an initial point of the welding nozzle 64 to vary due to an operational error of the welding section 60 and other peripheral sections, it is possible to secure again the origin or to correct a change in each welding position.

On the other hand, when implementing, using the supplemental sections, the additional processes as described above, such as the clearing of the welding nozzle, the position detection of the welding nozzle, the cutting of the welding wire, and so forth, due to the fact that a position or three-dimensional movement of the welding gun 66 or the welding nozzle 64 of the welding section 60 is sensed by the proximity sensors 88 and 90 which are installed on the welding nozzle adjusting section 76 and transmitted to the central control section 92, a corresponding process can be precisely implemented.

All the above described processes and operations are implemented under the control of the central control section 92 in a state wherein they are programmed and inputted into the central control section 92. Of course, a worker can program the processes and operations in consideration of working circumstances, productivity, etc. as occasion demands.

As a result, the automatic welding system for cylinder block recycling according to the present invention, constructed as mentioned above, provides advantages in that, since it is possible to rapidly, precisely, stably and automatically weld a plurality of cylinder head seating parts, upper cylinder liner assembly parts, lower cylinder liner assembly parts and main bearing assembly parts which are formed in a cylinder block, workability and safety are improved.

Furthermore, because it is possible to simply clear a welding nozzle, prevent spatterings from adhering to the welding nozzle, cut welding wire to have a proper length, and accurately correct a welding position, quality of the cylinder block to be recycled is enhanced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An automatic welding system for cylinder block recycling, the system welding a cylinder head seating part, an upper cylinder liner assembly part, a lower cylinder liner assembly part and a main bearing assembly part, to enable a cylinder block of an engine to be recycled, the system comprising:
    a supporting section for rotatably supporting the cylinder block;
    a driving section installed on the supporting section for rotating the cylinder block;
    a welding section for welding the cylinder head seating part, the upper cylinder liner assembly part, the lower cylinder liner assembly part and the main bearing assembly part of the cylinder block;
    a moving section for moving the welding section along a lengthwise direction of the cylinder block to a welding execution position; and
    a central controlling section for controlling the driving section, welding section and the moving section;
    wherein the supporting section comprises:
    a base installed on the ground or a bottom;
    a plurality of supporting rollers rotatably installed on the base and arranged in a manner such that they define multiple pairs of supporting rollers along the lengthwise direction of the cylinder block;
    a first fixing roller fastened to one end of the cylinder block and rotatably engaged with one pair of supporting rollers among the multiple pairs of supporting rollers; and
    a second fixing roller fastened to the other end of the cylinder block and rotatably engaged with another pair of supporting rollers among the multiple pairs of supporting rollers;
    wherein a plurality of fixing holes are formed into one of the first and second fixing rollers; and wherein a fixing section is installed on the base, the fixing section having a fixing pin which is inserted into one of the plurality of fixing holes in a manner such that it can be selectively removed therefrom, the fixing pin fixing the one of the first and second fixing rollers thereby to fixedly maintain the cylinder block in a predetermined welding position.

2. The automatic welding system as claimed in claim 1, wherein an inner surface of each of the first and second fixing rollers is provided with a fastening piece for allowing the one end or the other end of the cylinder block to be fastened thereto.

3. The automatic welding system as claimed in claim 1, wherein locations where the plurality of fixing holes are formed into the one of the first and second fixing rollers are defined in a manner such that they correspond to locations where the cylinder block is fixedly maintained to enable welding operations for the cylinder head seating part, the upper cylinder liner assembly part, the lower cylinder liner assembly part and the main bearing assembly part of the cylinder block, to be executed, respectively.

4. The automatic welding system as claimed in claim 1, wherein the driving section comprises:
    a mounting bracket fastened to the supporting section;
    a driving motor mounted to the mounting bracket; and
    a reduction gear for receiving rotating force of the driving motor and rotating the first and second fixing rollers.

5. The automatic welding system as claimed in claim 4, wherein a plurality of position sensors each for detecting a rotating angle of the cylinder block are installed on one end of the reduction gear.

6. The automatic welding system as claimed in claim 5, wherein each of the plurality of position sensors comprises a proximity sensor.

7. The automatic welding system as claimed in claim 1, wherein the moving section comprises:
    a pair of guide rails fastened to a bottom through a second base;
    a supporting member which is able to be reciprocated along a lengthwise direction of the pair of guide rails and on which the welding section is mounted; and
    a conveyor capable of reciprocating the supporting member along the lengthwise direction of the pair of guide rails.

8. The automatic welding system as claimed in claim 7, wherein a plurality of limit switches for detecting an initial position and a reference position upon reciprocation, of the supporting member on the pair of guide rails are installed on the moving section.

9. The automatic welding system as claimed in claim 1, wherein the welding section comprises:
    a connector operatively fastened to the supporting member through a bracket;
    a welding gun operatively fastened to the connector and having a welding nozzle for fusing welding wire to the cylinder block;
    a tensioner for preventing the welding wire from being excessively sagged or tensed;
    a welding wire supplier for winding the welding wire therearound in a manner such that the welding wire can be paid off therefrom; and
    a hanger for stably holding the welding wire between the welding wire supplier and the welding gun.

10. The automatic welding system as claimed in claim 1, further comprising: a welding nozzle adjusting section for cleaning and adjusting the welding nozzle of the welding section.

11. The automatic welding system as claimed in claim 10, wherein the welding nozzle adjusting section includes a brush for removing spatterings which adhere to the welding nozzle of the welding gun.

12. The automatic welding system as claimed in claim 10, wherein the welding nozzle adjusting section includes a spatter preventing fluid applier for applying spatter preventing fluid to the welding nozzle thereby to prevent spatterings from adhering to the welding nozzle.

13. The automatic welding system as claimed in claim 10, wherein the welding nozzle adjusting section includes a welding wire cutter for properly maintaining a length of the welding wire.

14. The automatic welding system as claimed in claim 10, wherein the welding nozzle adjusting section includes a welding nozzle position detector.

15. The automatic welding system as claimed in claim 10, wherein the welding nozzle adjusting section includes a plurality of proximity sensors for sensing a position and movement of the welding nozzle.

16. An automatic welding system for recycling a cylinder block, the system comprising:

a supporting section configured to rotatably support the cylinder block;

a driving section installed on the supporting section and configured to rotate the cylinder block; and a welding section configured to weld the cylinder block and being adjacent to the supporting section;

wherein the supporting section comprises:

a first fixing roller and a second fixing roller, each of which is fastened to one respective end of the cylinder block, wherein one of the first and second fixing rollers defines a plurality of fixing holes; and a fixing pin configured to be inserted into one of the plurality of the fixing holes and to fix one of the first and second fixing rollers thereby to fixedly maintain the cylinder block in a predetermined welding position.

17. The automatic welding system of claim 16, further comprising:

a base installed on the ground or a bottom; and a plurality of supporting rollers rotatably installed on the base and arranged in a manner such that they define multiple pairs of supporting rollers along the lengthwise direction of the cylinder block;

wherein the first fixing roller is rotatably engaged with one pair of supporting rollers among the multiple pairs of supporting rollers; and wherein the second fixing roller is rotatably engaged with another pair of supporting rollers among the multiple pairs of supporting rollers.

18. The automatic welding system of claim 16, wherein the fixing pin can be selectively removed from one of the plurality of fixing holes.

19. The automatic welding system of claim 16, wherein the welding section is configured to weld at least one of a cylinder head seating part, an upper cylinder liner assembly part, a lower cylinder liner assembly part and a main bearing assembly part of the cylinder block.

20. The automatic welding system of claim 19, wherein the plurality of fixing holes are defined in the places corresponding to locations where the cylinder block is fixedly maintained to enable welding operations for the cylinder head seating part, the upper cylinder liner assembly part, the lower cylinder liner assembly part and the main bearing assembly part of the cylinder block, to be performed, respectively.

* * * * *